Feb. 6, 1940. H. E. BRANNON 2,189,127
FLUID HEATING DEVICE
Filed March 23, 1938
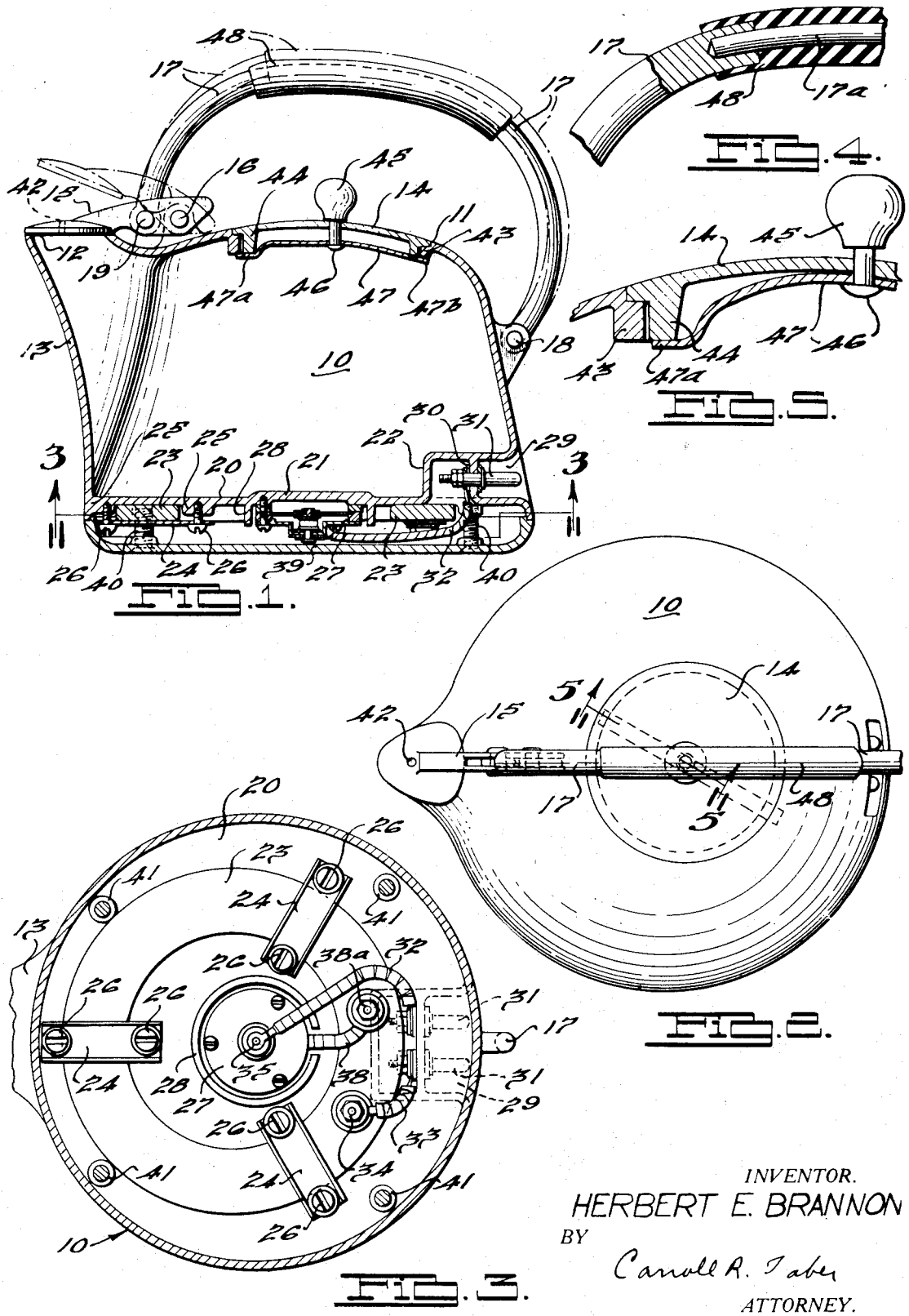
INVENTOR.
HERBERT E. BRANNON
BY Carroll R. Taber
ATTORNEY.

Patented Feb. 6, 1940

2,189,127

UNITED STATES PATENT OFFICE 2,189,127

FLUID HEATING DEVICE

Herbert E. Brannon, Detroit, Mich.

Application March 23, 1938, Serial No. 197,556

5 Claims. (Cl. 219—44)

This invention relates to devices of a character suitable for heating fluids such as water or the like. The invention as herein shown is embodied in a novel form of tea kettle, although obviously it may be embodied in other forms of heating devices.

The principal object of this invention is the provision of a device of the character described including a container for the fluid to be heated, and an electrical unit including heating element, switch and contacts, all located exteriorly of the container. A further object of the invention is the provision in a device of the character described of a one-piece container for the fluid to be heated having no openings in the walls thereof except the conventional inlet and outlet openings. Other objects include the provision of novel means for fastening a cover in position over the inlet opening, a novel arrangement of handle and closure for the outlet opening whereby the closure is opened when the device is lifted by means of the handle; and a novel handle construction arranged with a reduced section to provide for a spring action in the handle, the reduced section being covered with a molded grip formed of insulating material.

A preferred embodiment of the invention is illustrated in the accompanying drawing, wherein:

Figure 1 is a sectional view through a tea kettle;

Figure 2 is a top plan view of the tea kettle shown in Figure 1;

Figure 3 is a sectional view taken on substantially the line 3—3 of Figure 1;

Figure 4 is an enlarged sectional view of the handle shown in Figure 1; and

Figure 5 is an enlarged sectional view taken on substantially the line 5—5 of Figure 2.

The kettle illustrated in Figures 1 and 2 includes a one-piece container 10 preferably formed of cast aluminum and provided with an inlet opening 11 in the top of the central portion thereof, and an outlet opening 12 in the spout portion 13. A removable cover 14 is provided for the opening 11. A closure member 15 is provided for the opening 12. Closure 15, as will be described more in detail presently, is pivotally attached to the container 10 at 16. A handle 17 of curved formation, the details of which will be referred to hereinafter, has one end pivotally connected to the container 10 at 18 and the other end connected to the closure member 15 at 19.

As clearly shown in Figure 1 the bottom wall 20 of container 10 is preferably countersunk slightly with respect to the side wall thereof. It is provided centrally with a recess 21 extending into the interior of the container, and with a second recess 22 adjacent the side wall also extending into the interior of the container. An electrical heating element 23 in the form of a ring is secured in heat exchanging relation to the bottom wall 20 by means of straps 24. The bottom wall 20 is provided with a plurality of interiorly threaded bosses 25 which receive screws 26 for holding the straps against the element 23 and the latter against the bottom wall 20.

The heating element 23 is of conventional construction, the details of which form no part of the present invention. It is preferably arranged to encircle the central recess 21 in the bottom wall 20.

Within the recess 21 there is positioned a thermostat or temperature responsive switch 27 for controlling the heating element 23. The details of construction of switch 27 form no part of the present invention. The switch preferably includes any form of temperature responsive element, such as a bimetallic bar for example, which will be actuated to open the electrical circuit to heating element 23 at a predetermined temperature.

The switch 27 is preferably enclosed within an annular wall 28 formed integrally with the bottom wall 20 whereby to separate the same from the heating element 23. The switch 27 is arranged to be responsive to temperature changes of the bottom wall 20 rather than directly responsive to temperature changes of the heating element 23. To that end, the switch is located as far away from the heating element as possible and insulated from any transfer of heat by convection through the means of the wall 28.

While switch 27 may be adjusted to open the circuit at any desired temperature, it is preferred that the switch be adjusted to open the circuit only at a temperature below that which would be destructive to the bottom wall 20, without regard to the temperature within the container 10. In other words, the switch 27 serves merely as a safety factor to prevent the destruction of the container by an excess of heat.

Adjacent the recess 22 in the bottom wall 20 there is formed in the side wall of container 10 a recess 29 separated from recess 22 by a partition 30 formed integral with container 10. A pair of contact elements 31 are mounted through partition 30 with their inner extremities located within recess 22 and their outer extremities located within recess 29. The contacts 31 are suitably insulated from partition 30 and are provided with means at their inner extremity for attaching insulated connections 32 and 33 thereto. Electrical connection 33 has its opposite extremity connected to a terminal 34 of heating element 23, while the free extremity of connection 32 is connected to a terminal 35 of switch 27. A separate insulated electrical connection 38 is located between the other terminal 38a of heating element 23 and the other terminal, not shown, of switch 27. Contact elements 31 are of suitable construction to form an operative connection with one end of a conventional form of extension cord, the other end of which is adapted to be plugged into a wall socket to supply electrical current.

It should be here noted that the arrangement of the heating element 23, the switch 27, and the connection between them exteriorly of the container 10 is a novel feature of the present invention which is very advantageous in that it eliminates the possibility of these parts becoming corroded by reason of contact with the fluid contained within the container, as has been the case in similar devices in the prior art. This advantage, namely, the location of the entire heating unit exteriorly of the container, is attained without any sacrific in appearance inasmuch as it is enclosed by a removable housing 39 which is secured to the bottom 20 by means of screws 40, the bottom wall being provided with interiorly threaded bosses 41 to receive the screws. The housing 39 is designed to form a smooth joint with the outer side wall of container 10 when secured in position, thereby enhancing the appearance of the kettle as a whole.

In order to apprise the user thereof that the fluid within the container has been brought to the boiling point, the closure 15 is provided with an opening 42 of a form to permit the escape of steam with a whistling sound. In order that the opening 42 may be effective for this purpose, it is of course necessary that the closure 15 for spout opening 12 and the lid 14 for the inlet opening 11 be held securely in position to close these respective openings. To that end the wall of container 10 about opening 11 is formed with a shoulder portion 43 and the lid 14 is formed with a flange 44 spaced inwardly from its edge of a size to fit within the opening 11. The lid 14 is provided with a handle 45 which is secured to the lid by means of an elongated screw 46. This screw fits loosely enough in the lid to allow it to slide relative thereto when handle 45 is pulled away from the lid. Secured to the under side of lid 14 by means of the screw 46 is an elongated resilient clip or spring device 47.

As clearly shown in Figure 1 the spring 47 is of a length greater than the diameter of the opening 11 whereby the lid 14 is firmly held in position when installed as shown in Figure 1. One end 47b of the spring 47 projects a substantial amount beyond the shoulder 43, while the other end 47a projects but slightly over the shoulder 43. The end 47a may be retracted from its position over the shoulder 43 by merely pulling handle 45 away from the lid. This movement of the handle 45 bows the spring 47 upwardly, as shown in Figure 5, and thereby reduces its effective length. To install the lid the spring 47 is flexed by pulling the handle 45 away from the lid, at the same time pushing downwardly on the lid. In this manner the effective length of the spring 47 is reduced sufficiently to permit the insertion of the lid 14 in the opening 11. Upon releasing the handle 45 the spring 47 assumes the position shown in Figure 1, and effectively holds the lid in position until the spring is flexed by pulling the handle 45 away from the lid. The lid may be removed by merely pulling up on the handle 45.

The closure 15 is firmly held in position in the opening 12 by means of the handle 17. As previously described, the handle has one end pivotally connected to the closure 15 at 19 and one end pivotally connected to the container at 18. The closure itself is pivotally connected to the container at 16. This latter connection, 16, is located intermediate the opposite ends of handle 17. Thus, the handle 17, the closure 15, and the pivotal connections 18, 19 and 16, constitute a toggle construction. When the closure 15 is in its closed position, as shown in full lines in Figure 1, the connection 19 is located at one side of a straight line through the connections 16 and 18, and when the closure is in its opened position, as shown in dotted lines, the pivotal connection 19 is located at the opposite side of a straight line through the connections 16 and 18. Therefore, it is apparent that handle 17 must be stretched or flexed in order to swing the closure 15 from the closed position shown in full lines to its open position shown in dotted lines, or from its open position to its closed position. As previously mentioned, the handle is of a flexible construction. Its flexibility is of such character as to cause the closure 15 to swing to the open position when the container is lifted by means of the handle 17 but to hold the closure 15 in either its open or closed position until the handle is flexed by the user pushing the same down or lifting the same up.

To provide for adequate flexibility in the handle 17, it is preferably formed with a reduced section 17a intermediate its extremities. This section 17a may be formed integrally with portions 17 or as a separate piece inserted in the ends of portions 17. The section 17a has secured thereto and is inclosed by a hand grip 48, formed of any suitable insulating material, to protect the user of the kettle from the heat which flows into the metal portion of the handle 17.

While the invention has been herein shown and described as embodied in a kettle for heating water, it will be readily appreciated that it is applicable to many other forms of heaters without departing from the scope of the invention defined by the appended claims.

I claim:

1. A device of the character described comprising a container for a fluid to be heated, including bottom and side walls, an electric heating element located outside of the container and arranged in heat exchanging relation to the bottom thereof, a housing removably secured to the container for enclosing the heating element, a recess formed in the side wall of the container, a pair of electrical contact elements rigidly mounted wholly within said recess, and means for connecting said contact points with the heating element exteriorly of the container.

2. A device of the character described comprising a container for a fluid to be heated including bottom and side walls, an electrical heating element located outside of the container and arranged in heat exchanging relation to the bottom wall thereof, the side wall of the container provided with a recess, the bottom wall of the container also provided with a recess separated from the first mentioned recess by a partition outside of the container, a pair of contact elements mounted upon said partition with their upper extremities located within the recess of the bottom wall and their outer extremities located within the recess of the side wall, and means located exteriorly of the container for connecting the inner extremities of the contact points to the heating element.

3. A device of the character described comprising a container for fluid to be heated including bottom and side walls, an electric heating element removably attached to the container, said heating element being located outside of the container and arranged in heat exchanging relation to the bottom thereof, a temperature responsive switch electrically connected to the heating element and removably attached to the container, said switch being located outside of the container and arranged in heat exchanging relation to the bottom thereof but insulated against direct transfer of heat from said heating element, the heating element and switch being removable from the container independently of each other, and a housing removably attached to the container for enclosing the heating element and switch.

4. A device of the character described comprising a container for fluid to be heated including bottom and side walls, an electric heating element removably attached to the container, said heating element being located outside of the container and arranged in heat exchanging relation to the bottom thereof, a temperature responsive switch electrically connected to the heating element and removably attached to the container, said switch being located outside of the container and arranged in heat exchanging relation to the bottom thereof but insulated against direct transfer of heat from said heating element, the heating element and switch being removable from the container independently of each other, contact elements connected to a wall of the container, means for connecting said contact elements to the heating element and switch exteriorly of the container, and a housing removably attached to the container for enclosing the heating element and switch.

5. A device of the character described comprising a container for fluid to be heated including bottom and side walls, an electric heating element removably attached to the container, said heating element being located outside of the container and arranged in heat exchanging relation to the bottom thereof, a temperature responsive switch electrically connected to the heating element and removably attached to the container, said switch being located outside of the container and arranged in heat exchanging relation to the bottom thereof but insulated against direct transfer of heat from said heating element, the heating element and switch being removable from the container independently of each other, a recess in the side wall of the container, a pair of electrical contact elements rigidly mounted wholly within said recess, means for connecting said contact elements with the heating element exteriorly of the container, and a housing removably attached to the container for enclosing the heating element and switch.

HERBERT E. BRANNON.